United States Patent
Banwell et al.

(10) Patent No.: US 6,625,270 B1
(45) Date of Patent: Sep. 23, 2003

(54) METHOD, APPARATUS, AND SYSTEM FOR FILTERING INCOMING TELEPHONE CALLS

(75) Inventors: Thomas C. Banwell, Madison, NJ (US); Ariel Dori, Chester, NJ (US); Keku M. Mistry, Somerset, NJ (US); Thomas J. Robe, Basking Ridge, NJ (US)

(73) Assignee: Telecordia Technologies, Inc., Morristown, NJ (US)

( * ) Notice: Subject to any disclaimer, the term of this patent is extended or adjusted under 35 U.S.C. 154(b) by 0 days.

(21) Appl. No.: 09/392,403

(22) Filed: Sep. 9, 1999

Related U.S. Application Data

(60) Provisional application No. 60/099,650, filed on Sep. 9, 1998.

(51) Int. Cl.[7] .................................................. H04M 3/42
(52) U.S. Cl. ................. 379/196; 392/201; 392/142.01; 392/142.04
(58) Field of Search ....................... 379/142.01–142.18, 379/201.01, 196, 197, 198, 199

(56) References Cited

U.S. PATENT DOCUMENTS

| | | | | |
|---|---|---|---|---|
| 4,791,664 A | | 12/1988 | Lutz et al. ................... 379/199 |
| 4,802,202 A | * | 1/1989 | Takahashi et al. ............. 379/67 |
| 4,845,743 A | | 7/1989 | Lutz ............................ 379/199 |
| 4,942,598 A | * | 7/1990 | Davis .......................... 379/142 |
| 5,003,595 A | | 3/1991 | Collins et al. ................ 380/25 |
| 5,127,049 A | * | 6/1992 | Sabo ........................... 379/199 |
| 5,198,806 A | * | 3/1993 | Lord ............................ 379/102 |
| 5,206,900 A | | 4/1993 | Callele ........................ 379/142 |
| 5,341,411 A | | 8/1994 | Hashimoto .................... 379/67 |
| 5,377,260 A | * | 12/1994 | Long ............................ 379/142 |
| 5,408,528 A | | 4/1995 | Carlson et al. ............. 379/211 |
| 5,483,596 A | | 1/1996 | Rosenow et al. ............. 380/25 |
| 5,497,414 A | | 3/1996 | Bartholomew .............. 379/142 |
| 5,546,448 A | | 8/1996 | Caswell et al. ............. 379/142 |
| 5,631,951 A | | 5/1997 | Chen ........................... 379/67 |
| 5,644,629 A | * | 7/1997 | Chow ......................... 379/142 |
| 5,724,408 A | * | 3/1998 | Morganstein ............... 379/142 |
| 5,745,559 A | | 4/1998 | Weir ........................... 379/199 |
| 5,781,613 A | | 7/1998 | Knuth et al. ................. 379/67 |
| 5,852,653 A | * | 12/1998 | Reel et al. .................... 379/88 |
| 5,872,832 A | * | 2/1999 | Bishel et al. ................ 379/39 |
| 5,901,284 A | | 5/1999 | Hamdy-Swink ............ 395/186 |
| 5,905,780 A | * | 5/1999 | Wilber ..................... 379/93.02 |
| 6,016,341 A | * | 1/2000 | Lim ............................ 379/142 |
| 6,026,152 A | * | 2/2000 | Cannon et al. ............. 379/142 |
| 6,044,148 A | * | 3/2000 | Bleile .......................... 379/142 |
| 6,061,438 A | * | 5/2000 | Shen et al. .................. 379/161 |
| 6,353,664 B1 | * | 3/2002 | Cannon et al. .......... 379/142.1 |
| 6,359,970 B1 | * | 3/2002 | Burgess ..................... 379/67.1 |

* cited by examiner

Primary Examiner—William J Deane
(74) Attorney, Agent, or Firm—Joseph Giordano; James W. Falk

(57) ABSTRACT

A method and system for restricting telephone access to a predetermined set of telephone numbers. The method includes comparing the output of a caller ID signal decoder to telephone numbers stored in memory and allowing the telephone call to be completed if there is match between the calling party's number and a number stored in memory. The system consists of connection circuitry to which is connected a caller ID decoder, a number comparator, and an off hook detector. These components interact to restricts calls to only those stored in the number comparator.

4 Claims, 3 Drawing Sheets

METHOD, APPARATUS, AND SYSTEM FOR FILTERING INCOMING TELEPHONE CALLS

RELATED APPLICATIONS

The present application claims the benefit of U.S. Provisional Application No. 60/099,650 filed on Sep. 9, 1998 and entitled "CALLER ID INVERTER BLOCKER".

FIELD OF THE INVENTION

This invention relates to blocking incoming telephone calls and specifically to an apparatus and method for allowing only a predetermined set of telephone numbers to complete a telephone call thereby blocking access to numbers not within the predetermined set.

BACKGROUND OF THE INVENTION

Caller identification is a popular service provided by telephone communications service providers. In accordance with caller identification service, a subscriber or called party is provided the telephone number (by in-band signaling means) of a calling party. In conjunction with subscribing to this service the calling party's number is displayed either on separate device, a caller identification device or box, or a telephone at the called party's location. Caller identification devices have evolved from their initial primitive state to be more sophisticated devices that provide memory for storing telephone numbers. The numbers that are stored in memory are usually a set of numbers to whom the called party wishes to deny call completion. These stored numbers therefore form a set of calling numbers that are rejected as part of the caller identification service. The stored numbers then provide a call rejection service in conjunction with the caller identification service. Of course call rejection via this service or method works perfectly provided the subscriber populates the memory with the numbers except for only those from which a call is desired (a daunting task despite the fact that memory is relatively cheap). On the other hand, the called party, if present when the phone rings, may simply look at a telephone number display on the caller identification box and determine whether to answer the call. Accordingly, the called party may choose not to answer a call based on the calling party's number.

Of course, the calling party can block the transmittal of its number by dialing a pre-specified code which gives an indication of "No Number Delivered" at the called party's location. In such situations, the called party may choose to have the call automatically terminated, usually after one ring, as part of the caller identification service. On the other hand, and as described in Hashimoto's U.S. Pat. No. 5,341,411, (hereinafter Hashimoto) the called party can manually bypass or override the automatic rejection of calls from the calling party whose number is not sent or is stored in the caller identification device or box. By Hashimoto's method, even where the calling party's number is blocked the called party may still be able to manually screen the call by playing an answering machine message and allowing the calling party to leave their number. Hashimoto provides this additional improvement on caller identification service by way of a more sophisticated caller identification device that initiates an answering machine based on underlying ringing voltages that occur before the service provider can terminate the call.

In U.S. Pat. No. 5,781,613, Knuth, et. al., (hereinafter Knuth) improve on Hashimoto by seizing a blocked calling party's number after one ring and relaying an appropriate message to the calling party. Again, as ashimoto, Knuth requires human intelligence to decide whether the caller should be responded to (note here that in the context of this invention a message to the effect that "Blocked calls are not accepted" is not considered a response). Most notably, neither Knuth nor Hashimoto restricts access to the called party based on a set of authorized users or phone numbers. That is, the called party is always successful in completing the call.

In contrast, limiting phone line access to a predetermined set of numbers is a rather desirable feature for the public telephone companies, public utilities, universities, businesses, and, to a certain extent, consumers. With respect to telephone companies, the loss of man power over the years has resulted in a substantial increase in the remote monitoring of many office functions such as the power systems, alarm control systems, environmental control systems, etc. Remote monitoring also provides the cost advantage of is reducing craft personnel having to service offices and remote sites. More than likely remote monitoring is done through the Public Switched Telephone Network (PSTN) over a phone line terminating on a modem. Many other public utilities, e.g., power companies, also monitor different aspects of their respective networks over the PSTN. In general, utilities, telephone service providers, universities and businesses all have computer systems which are accessible by dial-in phone lines over the PSTN. The use of public telephone lines to remotely monitor telephone equipments, environmental control systems, or computer systems has certain associated security risks. Most prominent is the risk that hackers will somehow access this mission critical equipment and cause damage to the equipment or its operation thereby resulting in economic or human harm. For the telephone service provider, unauthorized access to the PSTN's power, alarm, and control monitoring systems could lead to significant loss of revenue. With respect to consumers, the ability to eliminate unwanted telemarketing-calls is rather enticing. More importantly, as homes become smarter, consumers will be able to purchase smart systems that are accessible via a modem over the PSTN. As such, consumers will be subject to ever increasing exposure to invasion of their privacy and homes, albeit electronic invasion. Physical security provides the foremost insurance against intrusion or theft.

Popular methods of restricting access to computer systems include providing a database of authorized telephone numbers on the very computer system that includes the protected information. In one prior art method the computer resource to which access is requested queries the calling party for a PIN. In another method the computer resource accepts the call, hangs up, and dials back the calling party provided the number matches one stored in a database. In yet another prior art method, the computer resource checks the number against a list residing in the computer's memory. All these systems suffer from the drawback that the telephone call is established prior to determining whether the calling party is an authorized party.

In U.S. Pat. No. 5,901,284, Hamdy-Swink (hereinafter Hamdy-Swink) describes a method for restricting access to a called party before establishing the telephone call. The Hamdy-Swink method and system are, however, rather sophisticated and costly. To begin, Hamdy-Swink requires use of the Advanced Intelligent Network (AIN) to implement the security methods described therein. The AIN requires the use of costly switching systems and rather complicated software to operate. In addition, Hamdy-Swink authenticates the user based on the exchange of a security token. Essentially, Hamdy-Swink uses the PSTN to provide security by authenticating the user prior to establishing the end-to-end telephone connection. Accordingly, this method is not intended for the user who does not want a costly network based or private solution.

Accordingly, a device or system that filters telephone calls based on the telephone number would be desirable for the public telephone companies, utilities, and consumers. Filtering the phone call and allowing access to only those authorized are intended as a security enhancement over the firewall or other more sophisticated forms of computer security. Such a system should be simple and fairly inexpensive, both to purchase and to maintain. Furthermore, it would also be desirable if such a system is not network based or a unique private solution.

SUMMARY OF THE INVENTION

Our invention is an electronic security system that prevents incoming calls from all but a small set of originating caller phone numbers from reaching a called party's telephone, modem, or computer. Our system is available to any user of the PSTN that needs to restrict incoming caller access to a specific telephone or modem circuit, provided such user is willing to subscribe to the caller identification service. With the system in place, only pre-authorized calling phone numbers can complete a call to the protected line. At the heart of our invention is a device or apparatus that can be implemented with relatively few inexpensive components. When the device is coupled to a commercially available caller identification device in accordance with one aspect of our invention, only a predetermined set of telephone numbers are accessible to either a destination modem or a telephone set.

It is therefore an object of our invention to secure the called party's subtending equipment, most likely a computer system, against hackers by not establishing the telephone call unless the calling party's number is among a list of authorized numbers.

It also an object of the present invention to secure a called party's subtending equipment for relatively minimal cost and without the need for complex computer systems.

Accordingly, our system includes a connection circuit coupled to the public switched network to which is also coupled a caller-ID signal decoder;

a caller-ID number comparator is also coupled to both the caller-ID signal decoder and the connection circuit. The connection circuit is finally coupled to the secured modem or computer system and an off hook detector.

In an aspect of our invention, upon reception of an incoming call, the connection circuit holds the telephone line open, i.e., the line is kept on-hook. The caller-ID signal decoder then decodes the in-band message having the telephone number of the calling party. The decoded telephone number is then fed to the comparator which sends out a release signal to the connection circuit upon finding a telephone number in memory that matches the calling party's telephone number. The connection circuit, responsive to the release signal, then allows the call through by coupling the ringing voltage to the called party's subtending equipment. An off hook detector is thereafter used to sense the end of the call previously established in accordance with our invention. Once the off hook detector senses the end of the call, it resets the connection circuit.

In accordance with another aspect of our invention, if the caller identification device is replaced with a controller having memory and a processor other features can be implemented including time of day call blocking, dynamic number management, and password access.

DETAILED DESCRIPTION OF THE INVENTION

Figure 1:
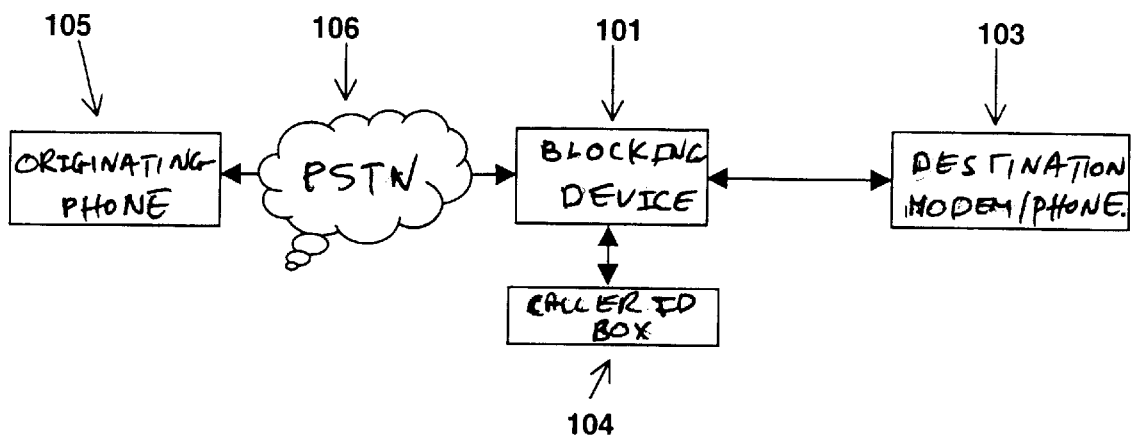
FIG. 1 is an illustrative conceptual embodiment of our invention for filtering phone calls.

Turning now to FIG. 1, there is a depicted a high level illustrative embodiment of our invention when incorporated in the Public Switched Telephone Network (PSTN). Our inventive system consists of a Blocking Device 101 that inter-connects a Destination Modem (or phone) 103 and a Caller ID Box 104.

Again with reference to FIG. 1, a user at originating phone 105 calls the number for a destination modem/phone 103 via the PSTN 106. The line supporting the destination modem/phone is equipped with caller identification box 104 and supports the caller identification feature provided by a telephone service provider via the PSTN 106. Caller identification box 104 can store incoming phone numbers and has a call reject feature. Specifically, caller identification box 104 is a commercially available device that rejects numbers that are stored in memory resident in the caller identification box 104; the operation of such devices is well known in the art. When a call is rejected, the caller identification box 104 normally takes the line off-hook and plays a voice message indicating to the originating caller 104 that the call cannot be completed.

Blocking device 101 is used to isolate the destination modem/phone 103 from the PSTN 106. In accordance with our invention blocking device 101 delays completion of a call from the originating phone 105 to destination modem/phone 103 so that caller identification box 104 initially can compare the originating number to numbers stored on caller identification box 104. If the originating number matches a number stored in memory, then caller identification box 104 provides an off hook signal. Normally, the off hook signal would be followed by a recording from the caller identification box 104 indicating that the call was being rejected. However, in accordance with our invention, when blocking device 101 detects the off hook signal from the caller identification box 104, the destination modem/phone 103 is no longer isolated from the line and the call is allowed to be completed. The destination modem 103 (in answer mode) detects ringing and answers. In the case of a destination phone 103, a user would be able to answer the phone. Thus, it is critical to the design of blocking device 105 that whatever circuitry is used draws less than 6 milliamperes thereby allowing the destination modem/phone 103 to remain on hook while supporting blocking device 101.

Essentially, the blocking device 101 inverts the functions of the caller identification box 104 by allowing only the numbers stored on the caller identification box 104 access to the destination modem. Although more detailed discussions below will,make it clear, those skilled in the art may at this point note that such a device in accordance with own invention can be manufactured quite inexpensively. In fact, blocking device 101 is an arrangement of commercially available resistors, transistors, LEDs, a switch and a bridge rectifier. As such, our invention distinguishes itself over the prior art by providing filtering or screening without the need of human intelligence or relatively expensive software and processor.

The additional physical components required of a user wishing to use our invention are just blocking device 101 and caller identification box 104 arranged as shown in FIG. 1. This is a rather uncomplex and cheap arrangement, especially with respect prior art methods. Indeed, for less than $20.00 towards the purchase of the blocking device 101 and the caller identification box 104, a user may use our invention as a first line measure of physical security. The combination as shown in FIG. 1, however, provides a low level of security (although the level of security is higher than that currently provided). Accordingly, our invention may be enhanced by employing a controller having a processor and additional memory.

Figure 2:
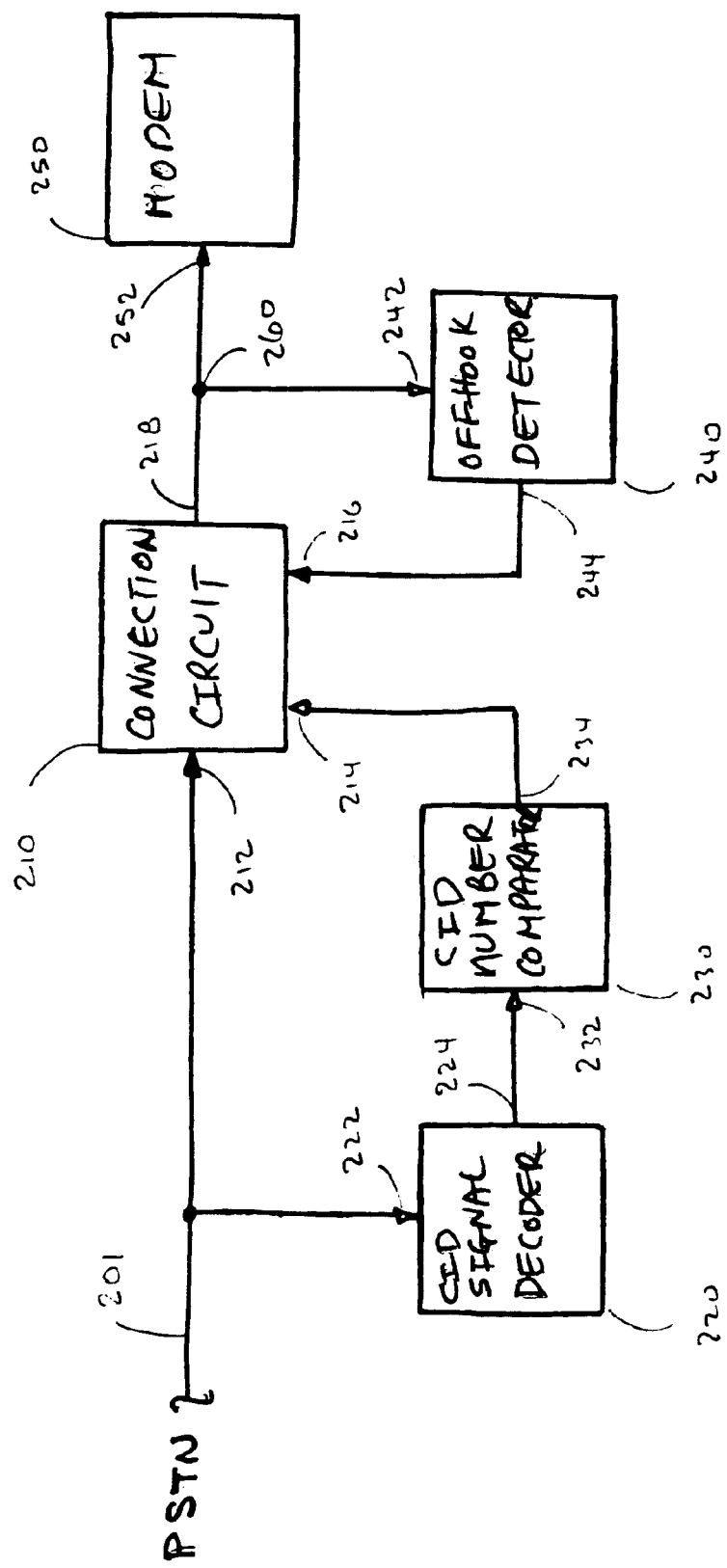
FIG. 2 is block diagram illustrating the functional components of a system for filtering phone calls in accordance with an aspect of our invention.

Turning now to FIG. 2 there is depicted a detailed functional block diagram of our invention in accordance with the concept embodied in FIG. 1. Specifically, FIG. 2 shows a block diagram of a modem access circuit that uses caller-id (CID) signaling for access validation. FIG. 2 includes PSTN access terminal 201, connection circuit 210, CID signal decoder 220, caller-id (CID) number comparator 230, off-hook detector 240, and secured modem 250.

Terminal 201 represents a standard point of electrical connection to the PSTN. Connection circuit 210 includes input terminal 212, output terminal 218, connect enable input 214 and connect disable input 216. The secure modem 250 includes input 252 that is coupled via node 260 to connection circuit output 218. CID signal decoder 220 has input 222 and output 224. Both connection circuit input 212 and CID decoder input 222 are connected to PSTN access terminal 201. In one embodiment, output 224 could be a 10-bit binary word. CID number comparator 230 has input 232 and output 234. Input 232 is received from output 224, and output 234 is accepted by enable input 214. Off-hook detector 240 has input 242 and output 244. Output 244 is received by disable input 216. Input 242 is connected to output 218 and detects an off hook condition at output 218.

Connection circuit 210 normally assumes a "not-connected" state isolating input 212, connected to the PSTN, from output 218 connected to modem input 252. Connection circuit 210 assumes a "connected" state providing an electrical connection between input 212 and output 218 after a signal is applied to enable input 214 for a predetermined duration. The "connected" state is held by 210, if modem input 252 assumes an off-hook state during the predetermined duration, and may persist even after the signal at input 214 is removed. In one embodiment, input 242 of off-hook detector 240 senses the activity at node 260 and detects a return of the modem to the high-impedance off-hook condition, producing in response an output signal 244. In another embodiment, input 242 of off-hook detector 240 senses the activity at node 260 and detects a change in data exchange between the modem and PSTN, producing in response an output signal 244. Connection circuit 210 is forced into the "not-connected" state by application of the signal from 244 to disable input 216. Elements 210 and 240 are shown in FIG. 2 as separate entities for purposes of operational description. In accordance with an embodiment of the invention, a single device can implement the functions of both 210 and 240 by sensing the DC current at output 218.

CID signal decoder 220 recovers the caller-id number according to prior art. Decoder 220 detects the FSK modulated CID signal present at terminal 201 between the first and second ring pulses at the start of an incoming call. The CID number is produced at output 224. CID number comparator 230 compares the number applied to input 232 from the CID signal decoder 220 with a list of one or more numbers contained in memory. This list of numbers, for example, could be calling party telephone numbers authorized to access the secure modem. An active level is asserted at output 234 when the number at input 232 matches one of the entries contained in memory.

In the quiescent state, modem 250 is isolated from the PSTN by connection circuit 210. An incoming call is received by CID signal decoder 220 which recovers the CID number. If the incoming call CID number matches a number stored in memory of comparator 230, a signal is generated at output 234 which enables connection of the call to modem 250 via connection circuit 210. An incoming call with an unauthorized CID number is not connected to modem 250. The end of a call session is detected by off-hook sensor 240 which causes connection circuit 210 to disconnect modem 250 from the PSTN.

In accordance with the description above, it will be noted that in the case where the calling party chooses to block displaying his or her telephone number, the call is automatically not allowed through to the modem, telephone or other terminating device.

Figure 3:
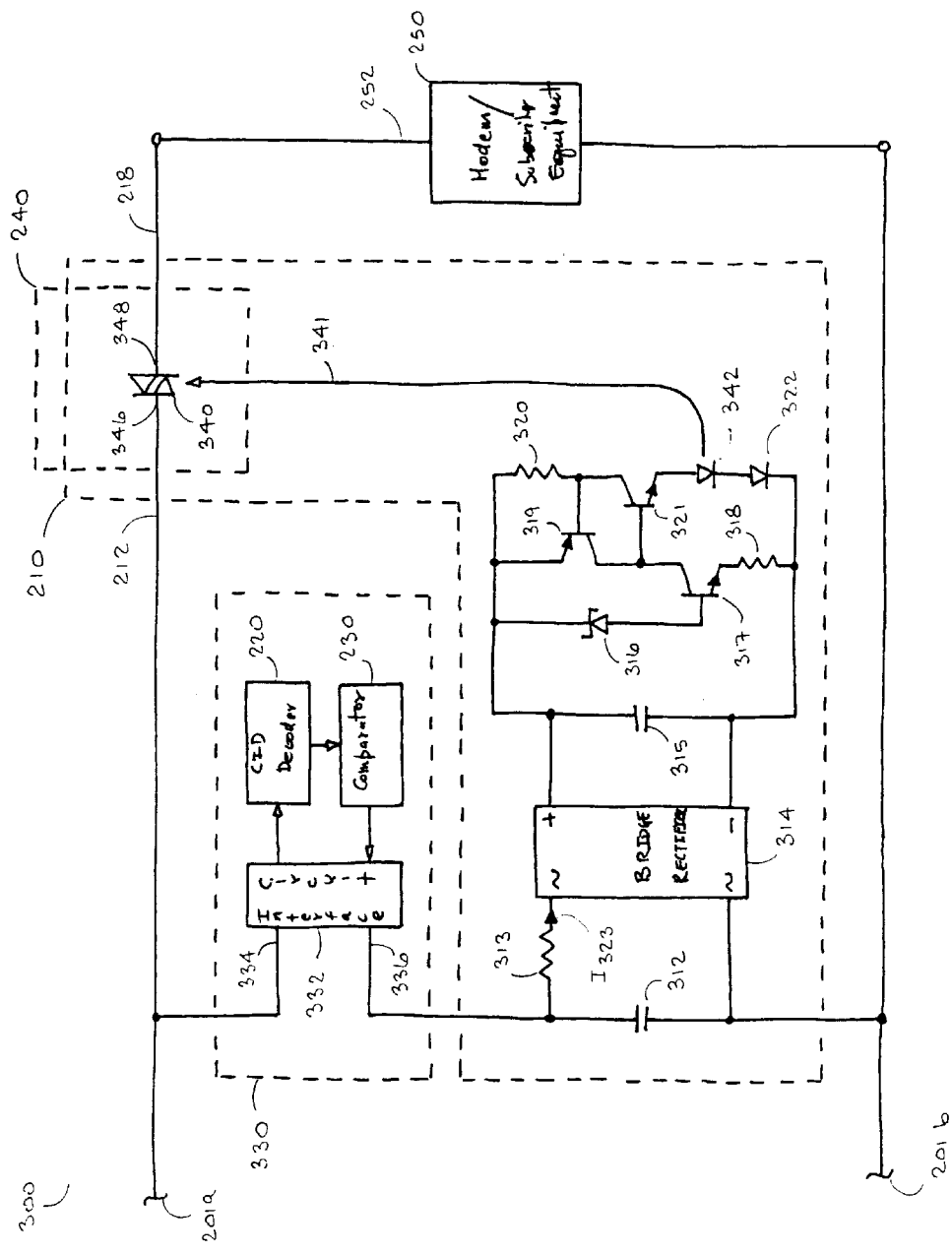
FIG. 3 is a circuit diagram of an embodiment of the block diagram of FIG. 2 in accordance with our invention.

Turning now to FIG. 3 there is shown a schematic diagram for an implementation or embodiment of the modem access circuit in FIG. 2 which uses caller-id (CID) signaling for access validation or filtering. FIG. 3 includes a two-wire electrical connection to the PSTN via terminals 201a (tip) and 201b (ring), connection circuit 210, caller-id device 330 and secured modem 250. Note that secured modem 250 is meant to illustrate only this particular embodiment of our invention, several other types of user terminating equipment may be likewise connected at the called party's location; as those skilled in the art will recognize, the user terminating equipment will be more than likely be connected via a modem such as modem 250. In this embodiment connection circuit 210 includes an optocoupled TRIAC 340, which serves as a switch and separately performs the function of off-hook detector 240; however, other embodiments may be possible wherein the off-hook detector 240 is not included in connection circuit 210. Connection circuit 210 also includes a TRIAC trigger circuit consisting of capacitors 312, 315, resistors 313, 318, 320, bridge rectifier 314, zener diode 316, transistors 317, 319, 321, LED 322 and LED 342.

Caller-id device 330 is known in the prior art and is depicted to include caller-id (CID) signal decoder 220, caller-id (CID) number comparator 230, and line interface circuit 332. Line interface circuit 332 has line input 334 and line output 336, as well as internal connection to the CID signal decoder 220 and connection from CID number comparator 230. A CID signal applied between input 334 and output 336 is transferred to CID decoder 220 by interface circuit 332. CID decoder 220 extracts the CID number from the CID signal and provides the extracted number to CID number comparator 230. CID comparator 230 compares the incoming CID number against a list of one or more numbers contained in memory and causes interface circuit 332 to pass a DC current between input 334 and 336 for a short time in the event of a match. CID decoder 220 and number comparator 230 therefore act as a telephone number filter for all incoming telephone calls.

TRIAC 340 has signal terminals 346 and 348 and is activated by optical signal 341 from LED 342. Signal terminal 346 is connected to PSTN node 201a (tip) via input 212 while signal terminal 348 is connected to input 252 of secured modem 250 via output 218.

TRIAC trigger circuit 210 has an input filter comprising capacitor 312 connected to PSTN terminal 201b and Caller-id unit terminal 336, resistor 313 which is connected between terminal 336 and one input of bridge rectifier 314, and capacitor 315. Capacitor 315 is connected across the DC output of bridge rectifier 314. I323 is the DC current flowing through resistor 313.

Capacitor 312 shunts the 1200–2200 Hz CID signal to interface circuit 332.

Capacitor 315 in conjunction with resistor 313 comprise a low-pass filter. The current flowing through interface 332 should not exceed the "off-hook" threshold for the PSTN, otherwise the ring signal would be suspended before modem 250 could respond to the incoming call. Resistor 313 must therefore limit the maximum current drawn by interface 332 to an acceptable level.

Current I323 flows from interface 332 and charges capacitor 315. Transistors 317, 319 and 321, in conjunction with zener diode 316, LED 322 and LED 342, and resistors 318 and 320 comprise a regenerative threshold circuit that is connected across capacitor 315 and which triggers TRIAC 340 when the value of current I323 exceeds a preset threshold value. For sub-threshold values of current I323, transistor 319 is inactive and most of current I323 flows through zener 316, transistor 317 and resistor 318, with little or no current flowing through LED 342. LED 322 and LED 342 are characterized by a forward voltage drop that is stable against temperature variations. Transistors 319 and 321 are connected to form a regenerative latch which discharges capacitor 315 and current I323 into LED 322 and LED 342 when the voltage drop across resistor 318 transiently exceeds the total voltage drop across LED 322 and LED 342, which is about 1.5V. Once transistors 319 and 321 are activated, all of current I323 continues to flow through LED 342 until the current is interrupted by interface 332. The flow of current I323 through LED 342 produces optical signal 341 which triggers TRIAC 340. LED 322 provides a visual indication of the trigger circuit's status.

TRIAC 340 is normally in a high impedance state that isolates input 212 from output 218. Optical signal 341 places TRIAC 340 in a low impedance "on" state, allowing subsequent ringing signal and holding current to pass from terminal 201(a) to the secured modem 250. Input 252 draws a DC current from output 218 when modem 250 assumes the low-resistance "off-hook" state. TRIAC 340 will remain in a low-impedance "on" state as long as the DC current flowing through terminals 346 and 348 exceeds the TRIAC's holding current. Input 252 will draw a DC current for the duration of the call session. Modem 250 assumes a high-resistance "on-hook" state after the call session is terminated and no DC current is subsequently drawn by node 252. In the absence a DC current drawn by input 252 or an input signal 341, the TRIAC reverts to a high impedance "OFF" state. TRIAC 340 implicitly performs the function of off-hook detection circuit 240 in this particular embodiment.

In accordance with our invention, the circuit in FIG. 3 achieves the desired objectives of the invention using a minimum number of low cost components and operates solely on current from the PSTN without the need for an addition power source. The circuit in FIG. 3 can be modified to include an increased or variable time delay before a threshold response occurs. This can increase rejection of ringing current leakage through interface 332. In accordance with yet another embodiment, an auxiliary power source can be used to sustain the flow of current through LED 342 for a longer period of time than the duration that current I323 flows from interface circuit 332.

Our invention, as discussed above, is an inexpensive means for providing a first level of physical security where access to sensitive equipment or information is made accessible via the PSTN. By our invention, only authorized calling parties can complete a call. Our invention achieves this result independent of any human intelligence or sophisticated software as had prior art methods. In addition, subscribers to caller identification services need only expend a small additional sum, less than $20.00, to achieve the security offered by our invention.

The above description has been presented only to illustrate and describe the invention. It is not intended to be exhaustive or to limit the invention to any precise form disclosed. Many modifications and variations are possible in light of the above teaching. The applications described were chosen and described in order to best explain the principles of the invention and its practical application to enable others skilled in the art to best utilize the invention on various applications and with various modifications as are suited to the particular use contemplated.

What is claimed is:

1. Simplified apparatus at a subscriber location for restricting telephone access to a called subscriber number from the telephone network to only authorized calling parties, said apparatus not including any programmed processor, said apparatus comprising a caller-id device connected across the line at the called subscriber location, said caller-id device including a caller-id decoder, a caller-id comparator, and an interface circuit; and a connection circuit at the called subscriber location and in the line between the telephone network and the called subscriber, said connection circuit including a switch element for maintaining the line on-hook on reception of a call from the telephone network to the called subscriber, means for limiting the current flow there through across the line to less than the off-hook threshold for the telephone network when a ring signal is applied to the line from the telephone network, and means responsive to said caller-id device for applying a signal to said switch element to allow connection of a call from an authorized calling party to the called subscriber.

2. The simplified apparatus of claim 1 wherein said means for limiting current flow to less than the off-hook threshold comprises a resistor connected to apply current from the line through the caller-id device to the input of the connection circuit.

3. The simplified apparatus of claim 2 wherein said means responsive to said caller-id device for applying a signal to said switch element comprises a rectifier circuit to which said resistor is connected, a capacitor connected across the outputs of said rectifier circuit, and a regenerative threshold circuit connected across said capacitor.

4. The simplified apparatus of claim 3 wherein said switch element is an optical switch and said regenerative threshold circuit includes a light emitting diode.

* * * * *